US006966693B2

(12) United States Patent
Prakash et al.

(10) Patent No.: US 6,966,693 B2
(45) Date of Patent: Nov. 22, 2005

(54) THERMAL CHARACTERIZATION CHIP (75) Inventors: Satya Prakash, Poway, CA (US); George H Corrigan, III, Corvallis, OR (US); Winthrop D. Childers, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/345,637

(22) Filed: Jan. 14, 2003

(65) Prior Publication Data

US 2004/0136437 A1      Jul. 15, 2004

(51) Int. Cl.$^7$ .......................... G01K 7/42; G01K 17/06
(52) U.S. Cl. ........................ 374/163; 374/29; 374/110; 702/136
(58) Field of Search ................................ 374/163, 166, 374/183, 135, 137, 2.9, 30, 110; 327/513–512; 702/127, 135, 136

(56) References Cited

U.S. PATENT DOCUMENTS

| | | | |
|---|---|---|---|
| 4,478,076 A | 10/1984 | Behrer | |
| 4,478,077 A | 10/1984 | Bohrer et al. | |
| 4,501,144 A | 2/1985 | Higashi et al. | |
| 4,513,055 A * | 4/1985 | Leibowitz | 442/212 |
| 4,581,928 A | 4/1986 | Johnson | |
| 4,651,564 A | 3/1987 | Johnson et al. | |
| 4,683,159 A | 7/1987 | Bohrer et al. | |
| 4,739,657 A | 4/1988 | Higashi et al. | |
| 4,809,428 A | 3/1989 | Aden et al. | |
| 4,944,035 A | 7/1990 | Aagardl et al. | |
| 5,064,296 A * | 11/1991 | Huijsing et al. | 374/163 |
| 5,192,849 A | 3/1993 | Moslehi | |
| 5,213,416 A * | 5/1993 | Neely et al. | 374/178 |
| 5,311,448 A * | 5/1994 | Waggoner et al. | 703/13 |
| 5,359,236 A * | 10/1994 | Giordano et al. | 327/512 |
| 5,508,724 A | 4/1996 | Boyd et al. | |
| 5,519,354 A * | 5/1996 | Audy | 327/512 |
| 5,554,849 A * | 9/1996 | Gates | 250/370.08 |
| 5,653,892 A * | 8/1997 | Belcher et al. | 216/17 |
| 5,736,753 A * | 4/1998 | Ohno et al. | 257/77 |
| 5,745,130 A | 4/1998 | Becerra et al. | |
| 5,796,081 A * | 8/1998 | Carlsson et al. | 219/711 |
| 5,831,648 A | 11/1998 | Mitani et al. | |
| 5,881,451 A | 3/1999 | Kneezel et al. | |
| 5,963,662 A * | 10/1999 | Vachtsevanos et al. | 382/150 |
| 5,980,025 A | 11/1999 | Burke et al. | |
| 5,990,691 A * | 11/1999 | Joerg et al. | 324/750 |
| 6,061,464 A | 5/2000 | Leger | |
| 6,107,868 A * | 8/2000 | Diniz et al. | 327/543 |
| 6,167,258 A * | 12/2000 | Schmidt et al. | 455/419 |
| 6,217,239 B1 | 4/2001 | Orita et al. | |
| 6,259,264 B1 * | 7/2001 | Freund et al. | 324/760 |
| 6,303,911 B1 | 10/2001 | Welch, Jr. | |
| 6,349,269 B1 * | 2/2002 | Wallace, Jr. | 702/132 |
| 6,428,749 B1 | 8/2002 | Kajiyama et al. | |

(Continued)

FOREIGN PATENT DOCUMENTS

EP          358668 A  *  3/1990  ........... G11C 11/24

(Continued)

*Primary Examiner*—Gail Verbitsky (57) ABSTRACT

A thermal characterization chip comprising a substrate having overlying electronics, the electronics including semiconductor circuitry and thin film circuitry overlying the semiconductor circuitry; wherein the electronics define a plurality of thermal domains, each of the domains defining a portion of a receiving surface for receiving an external influence that alters a thermal parameter within the thermal domains; and wherein the electronics further comprises monitoring circuitry for monitoring the thermal parameter in each of the thermal domains over a test time period.

12 Claims, 5 Drawing Sheets

U.S. PATENT DOCUMENTS

| | | | |
|---|---|---|---|
| 6,477,479 B1 * | 11/2002 | Mansky et al. | 702/136 |
| 6,535,824 B1 * | 3/2003 | Mansky et al. | 702/30 |
| 6,559,667 B1 * | 5/2003 | Tarter | 324/760 |
| 6,565,177 B1 * | 5/2003 | Corrigan, III | 347/15 |
| 6,650,132 B2 * | 11/2003 | Pelissier | 324/760 |
| 6,668,230 B2 * | 12/2003 | Mansky et al. | 702/30 |
| 6,701,272 B2 * | 3/2004 | Cooper et al. | 702/132 |
| 6,786,639 B2 * | 9/2004 | Covi et al. | 374/178 |
| 6,849,458 B2 * | 2/2005 | Pantoliano et al. | 436/86 |
| 2004/0248315 A1 * | 12/2004 | Klein et al. | 436/147 |

FOREIGN PATENT DOCUMENTS

| | | |
|---|---|---|
| WO | WO 96/32061 | 10/1996 |

* cited by examiner

FIG. 6

THERMAL CHARACTERIZATION CHIP

BACKGROUND

The present invention generally relates to, for example, a device for characterizing a thermal "signature" of an external influence.

For various applications, it is desirable to be able to characterize the dynamic thermal "signature" of an external influence impinging upon a surface. The dynamic thermal signature can be thought of as a mapping of a thermal parameter on a two-dimensional surface over time. Once information concerning the dynamic thermal signature is obtained, it can be further processed, manipulated, displayed, etc., depending on the application. For example, it may be desirable to determine the thermal signature of a very small chemical reaction on a substrate as part of a "lab on a chip" application. To do so, it is useful to be able to determine the heat flux and/or temperature versus position and time over the area of the reaction. From this information, the thermal characterizations and evolution of a microreaction can be accurately tracked. In some cases, it may be desirable to cause some reactions with a desired and non-uniform temperature-time history imposed on different thermal domains. The non-uniform and dynamic thermal behavior can also be used for thermal property changes of the external material and could be used as a dynamic display device.

SUMMARY

A thermal characterization chip comprising a substrate having overlying electronics, the electronics including semiconductor circuitry and thin film circuitry overlying the semiconductor circuitry; wherein the electronics define a plurality of thermal domains, each of the domains defining a portion of a receiving surface for receiving an external influence that alters a thermal parameter within the thermal domains; and wherein the electronics further comprises monitoring circuitry for monitoring the thermal parameter in each of the thermal domains over a test time period.

DETAILED DESCRIPTION OF AN EMBODIMENT

An embodiment of the invention relates to a device and method for obtaining a dynamic thermal signature of an external influence. The device is a semi-conductor chip and is referred to herein as a "thermal characterization chip" or simply a "chip." The thermal characterization chip is capable of measuring effects of any external influence—such as thermal, chemical, electrical or magnetic influences—which usually involves physical contact between a material or object and a receiving surface of the thermal characterization chip. The material or object can have solid, liquid, or gaseous phase, or can be combination thereof. The material or object can include such examples as living tissue, chemicals, combinations or reactions of chemicals, cellular materials, etc. When the external influence contacts the receiving surface of the thermal characterization chip, the external influence alters a thermal parameter of the receiving surface of the chip. The thermal parameter that is altered can be, for example, a temperature at the receiving surface, a power level required to maintain a pre-selected temperature at the receiving surface, or it could be a heat flux through the receiving surface.

The receiving surface of the chip is divided into a plurality of thermal domains, each being individually controllable and monitored. In certain embodiments, the thermal domains of the receiving surface are physically arranged in a two-dimensional array. Monitoring circuitry in the chip monitors the thermal parameter individually for each of the thermal domains during a test period. The monitoring circuitry generates data that together constitute a dynamic thermal signature of the external influence. The dynamic thermal signature is a two-dimensional mapping of the thermal parameter over time.

Figure 1:
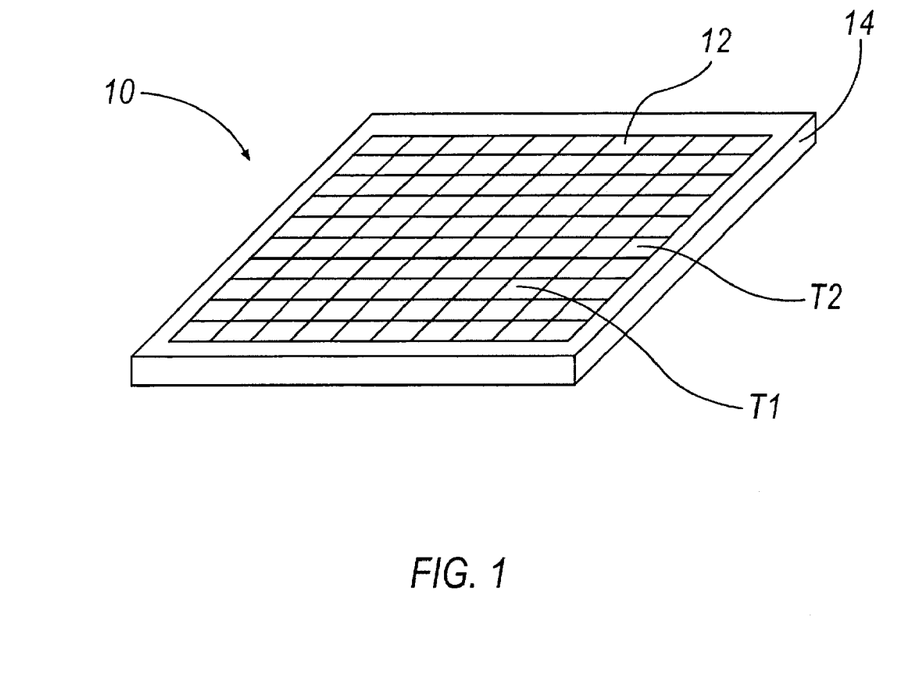
FIG. 1 is a perspective view of an embodiment of a thermal characterization chip.

FIG. 1 illustrates a particular embodiment of a thermal characterization chip. The chip generally includes an underlying substrate (not shown in FIG. 1) with an electronics and device layer 10 overlying the substrate. The electronics and device layer 10 includes semiconductor circuitry 14 and thin film circuitry 12 overlying the semiconductor circuitry 14. The electronics and device layer 10 defines a plurality of thermal domains, which together comprise the receiving surface of the chip. Reference numerals T1 and T2 represent two exemplary thermal domains on the receiving surface of the thermal characterization chip, though, as shown, the electronics and device layer includes a plurality of thermal domains, the specific number of which depending on the particular application. As described in more detail below, the thin film circuitry layer 12 can itself comprise multiple layers, each layer having a particular function. Generally, the thin film circuitry layer 12 is configured to receive and capture the external influence. The semiconductor layer 14 generally comprises circuitry for individually monitoring, sensing, and/or controlling the thermal domains on the chip.

Figure 2:
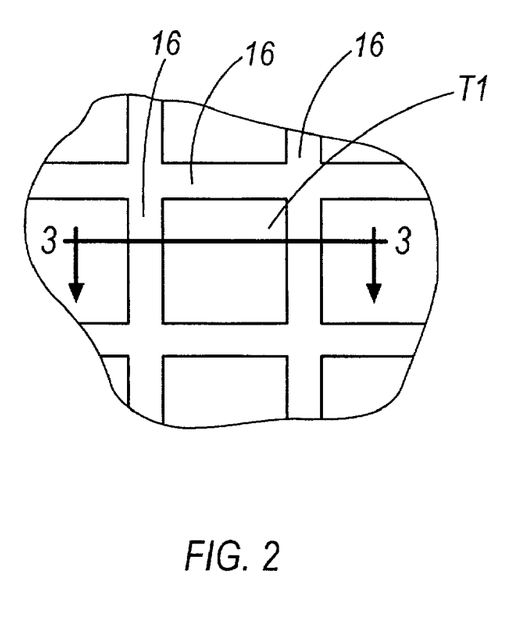
FIG. 2 is a magnified top view of an embodiment of a thermal characterization chip.

Now, with reference to FIGS. 2 and 3, embodiments of the thin film layer 12 and the semiconductor layer 14 will be described in additional detail. FIG. 2 illustrates a top view of a magnified portion of the thermal characterization chip illustrated in FIG. 1. Because FIG. 2 is a top view, it is only possible to see the magnified portion of the receiving surface of the thin film layer 12, which includes thermal domain T1. As shown in FIG. 2, each thermal domain may be surrounded by open "trenches" 16, which provide thermal isolation between the thermal domains. Although the simplified figures depict trenches that completely surround each domain, there will likely be breaks in the trenches to enable the routing of thin film power busses across the thermal characterization chip. The power buses are preferred for routing power to thin film resistors (described below) associated with the thermal domains. In one embodiment, the power buses are routed across diagonals of the domains to minimize the thermal impact on each domain.

Figure 3:
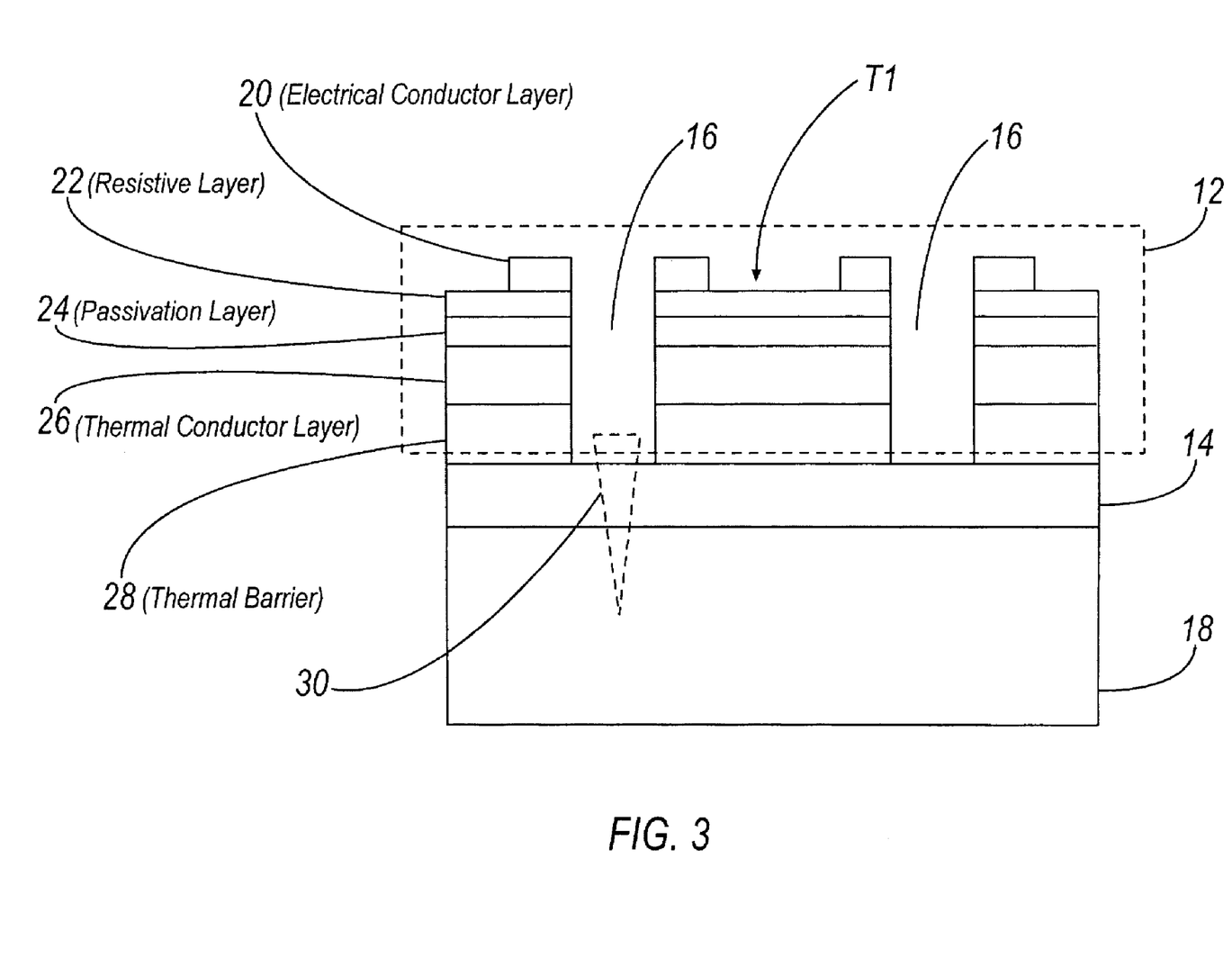
FIG. 3 is a schematic cross-sectional view of the thermal characterization chip illustrated in FIG. 2.

FIG. 3 is a cross-sectional view of the magnified portion of the thermal characterization chip set forth in FIG. 2, illustrated in schematic form. As shown in FIG. 3, the thin layer film 12 may be comprised of a plurality of different layers. An upper layer may be a layer of electrical conducting material 20. The electrical conductor layer 20 is configured to receive an energizing electrical current from a power source (not shown in FIG. 3) to energize the thin film resistors (described below) associated with each of the thermal domains. As indicated above, the power source may deliver the energizing current over thin film power busses. Below the electrical conductor layer 20 is a layer of resistive material 22, such as, for example, tantalum aluminum or tungsten silicon nitride (i.e., TaAl or WSiN). The resistive layer 22 of each thermal domain comprises the thin film resistor for each thermal domain referenced above. In one embodiment, the resistive layer 22 of each thermal domain is configured to have a temperature-dependent variable resistance such that the resistance changes in response to changes in its temperature. Below the resistive layer 22 is a passivation layer 24, which may be comprised of, for example, silicon nitride. The passivation layer 24 is configured to isolate the resistive layer 22 from the thermal conductor layer 26 (discussed below) to prevent electrical shorting in the event that the thermal conductor layer 26 is an electrical conductor. Below the passivation layer 24 is a thermal conductor layer, which may be comprised of, for example, aluminum. The thermal conductor layer 26 of each thermal domain is configured to change temperature in response to thermal energy dissipated by the associated resistive layer 22 (thin film resistor). Finally, below the thermal conductor layer 26 is a thermal barrier layer 28, which is configured to provide thermal isolation between the thermal conductor layer 26 and the semiconductor layer 14. The thermal barrier layer 28 limits the thermal dissipation of the thermal conductor layer 26 and further protects the semiconductor layer 14 from thermal changes associated with the thermal conductor layer 26. The thin film layer 12 may additionally include other layers, such as a passivation layer (not shown) over the electrical conductor layer 20.

Below the thermal barrier layer 28 of the thin layer film layer 12 is a layer of semiconductor devices 14 (described in more detail below), which overlays an underlying substrate 18. The substrate can be made from a variety of known materials for constructed integrated circuits, such as silicon. While not necessary, the trenches 16 can be extended into the semiconductor layer 14 and the underlying substrate 18, as shown by reference numeral 30, to provide additional thermal isolation between the thermal domains and their associated locations of thermal control in the semiconductor layer 14.

Figure 4:
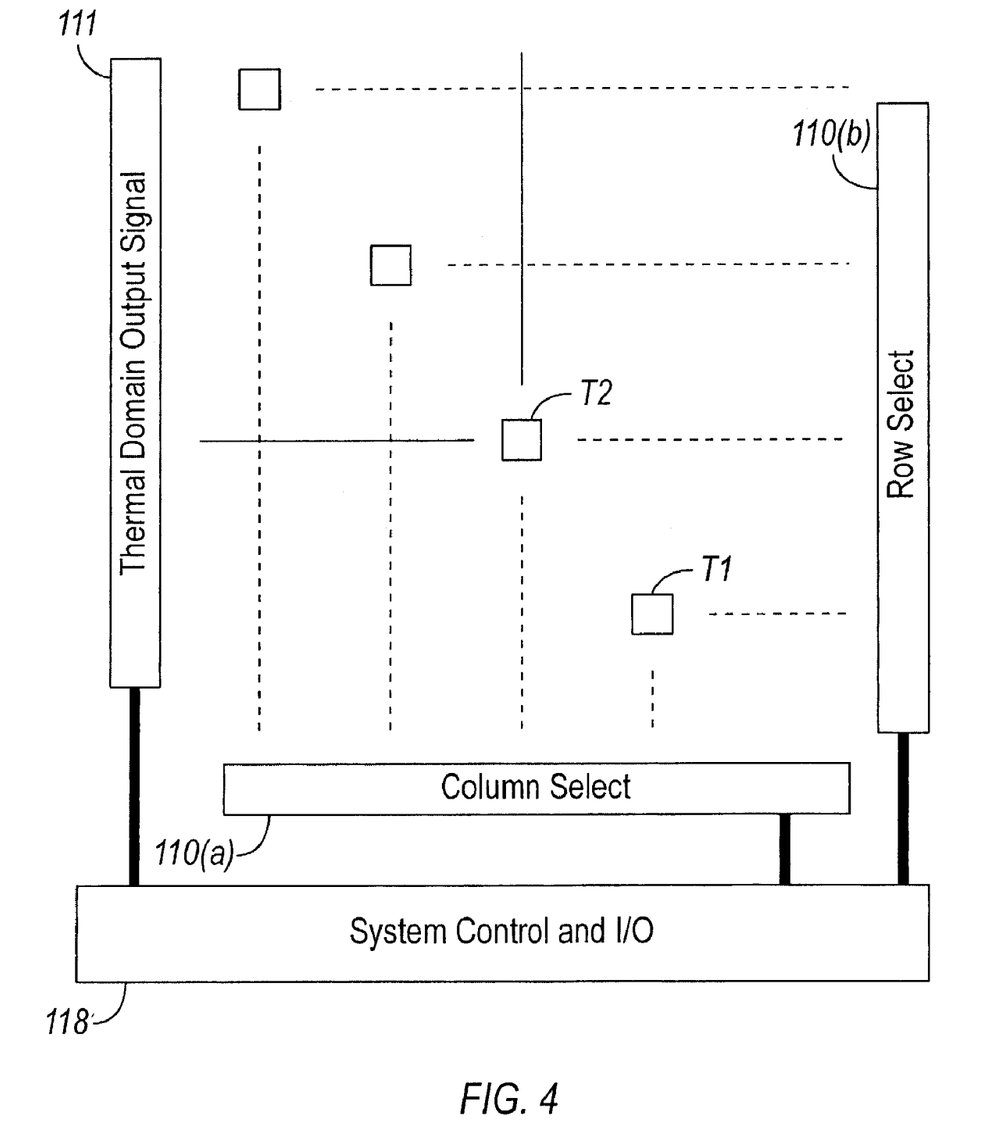
FIG. 4 is a schematic diagram of an embodiment of a thermal characterization chip, illustrating thermal domains on a receiving surface and certain electronics in block format.

FIG. 4 schematically illustrates thermal domains (e.g., T1 and T2) of a receiving surface of a thermal characterization chip and further illustrates control circuitry in block format. In FIG. 4, thermal domains (e.g., T1 and T2) are physically arranged in a two-dimensional array. FIG. 4 further illustrates that each thermal domain of a thermal characterization chip is in electrical communication with "selection" signals, set forth in FIG. 4 as "column select" 110(a) and "row select" 110(b). The "selection" signals are controlled by system control and input/output 118. The "selection" signals are used to selectively and individually control the temperature of the various thermal domains in the chip and to selectively and individually sense thermal domain output signals for each thermal domain over time. In essence, the "column select" signal 110(a) and "row select" signal 110(b) are used to establish a unique set of coordinates for each thermal domain in a two-dimensional array. By utilizing the unique set of coordinates, each thermal domain can be individually and exclusively controlled and sensed. FIG. 4 further illustrates a thermal domain output signal bus 111, over which the thermal domain output signal (V-Flux) for each thermal domain, depending upon which thermal domain is selected, is output. The thermal domain output signals are processed and output by the system control and input/output 118.

Now, a more detailed exemplary control circuit for controlling and monitoring the thermal domains, shown in FIG. 5, will be described. In one embodiment, the control circuit is integrated into the device as a semiconductor layer 14, as shown in FIG. 3. According to this embodiment of the invention, a purpose of the control and monitoring circuitry is to maintain the temperature of each thermal domain at a setpoint temperature in spite of external thermal influences. The temperature is maintained in each thermal domain by adjusting the power (current) supplied through the thin film resistor in each thermal domain, which increases or decreases the thermal dissipation of the thin film resistor to counteract the effects of the external influence. The change in power necessary to maintain the setpoint temperature in each of the thermal domains corresponds to the thermal characteristics of the external influence.

Figure 5:
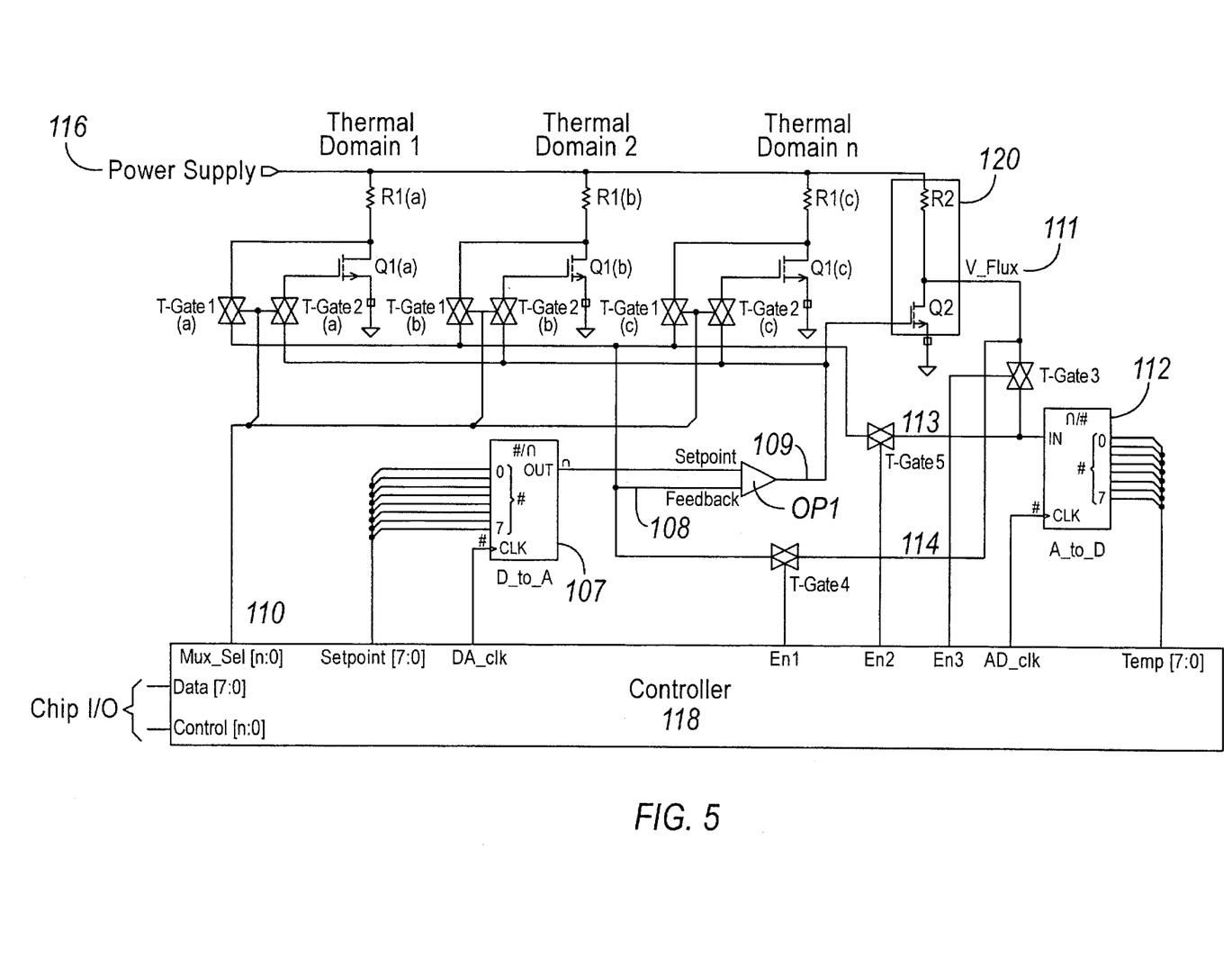
FIG. 5 is a circuit diagram illustrating an embodiment of control and sensing circuitry in an embodiment of a thermal characterization chip.

A plurality of thermal domains (for example, T1, T2) is illustrated at the top of FIG. 5. While three thermal domains (domains 1, 2, and n) are illustrated in the array, many more (or less) thermal domains could be connected in the array in a manner that would be readily understood by one of skill in the art in light of this disclosure. The thin film resistor 22 in each of the thermal domains is schematically illustrated in FIG. 5 as resistor R1. Resistor R1 dissipates thermal energy in relation to the amount of current flowing through it to heat its associated thermal domain. The resistor R1 has a variable resistance such that its resistance level is temperature-dependent. A power supply 116 supplies a constant electrical voltage to the resistor R1 of each of the thermal domains 1-$n$. As described above in connection with FIG. 3, the electrical voltage is supplied to the electrical conductor layer 20 of each of the thermal domains. The nominal value of the constant voltage from the power supply 116 is not germane to the invention and is purely a matter of design choice. The constant voltage effectively establishes a constant "reference" voltage level at the upper node of the resistors R1. Each resistor R1 is connected in series with a respective transistor Q1, which, when activated, provides a current path to ground. The transistor Q1 effectively acts as a control-signal dependent variable resistance in that the inherent resistance across the transistor Q1 decreases as the voltage level applied to its gate increases. Accordingly, for a given thermal domain, the total resistance across the electrical conductor level 20 (supplied with a constant voltage from the power supply 116) is the sum of R1 and the inherent resistance of Q1. So, for each thermal domain, resistor R1 and transistor Q1 effectively form a voltage divider circuit.

The voltage level at the node between resistor R1 and transistor Q1 (the "thermal domain output signal") is detected and provided to operational amplifier OP1 as a "feedback" signal, the purpose of which is described below. The thermal domain output signal is controlled through T-gate 1, which is selectively activated by selection signal 110 from system control and I/O 118. Selection signal 110, which also selectively activates T-gate 2 for each thermal domain, may be a digital word having a unique identification for each thermal domain so that the T-gate 1 and T-gate 2 for each thermal domain can be activated separately from the T-gates associated with the other thermal domains. In effect, the digital word, acting as the selection signal 110, can embody both a "column select" portion and a "row select" portion to uniquely identify each thermal domain in the chip. The selection signal 110 is generated by system control and I/O 118. When the selection signal 110 has a value that is associated with thermal domain 1, for example, T-gate 1(a) and T-gate 2(a) are both activated, each providing a signal pathway to/from the associated thermal domain. While the signal path through T-gate 1 allows the voltage level at the node between resistor R1 and transistor Q1 to be provided as a feedback signal to Op Amp OP1, the signal path through T-gate 2 allows the output signal 109 of Op Amp OP1 to be delivered to the gate of transistor Q1. Because the OP1 output signal 109 controls the gates of each of the transistors Q1 (for each thermal domain 1-n), control signal 109 controls the variable resistance associated with each of the transistors Q1.

The output signal 109 of Op Amp OP1 also controls the gate of transistor Q2, which is part of a "reference domain" 120. Reference domain 120 is thermally isolated from the thermal domains (such as T1 and T2) and is generally used to provide a reference against which each of the thermal domains can be compared and to provide an ultimate output signal, V-Flux 111, which, as described below, is indicative of the temperature of the thermal domains 1-n. The reference domain 120 electrically mirrors the basic voltage divider structure of each of the thermal domains 1-n in the sense that it includes a resistor R2 and a transistor Q2, which has a variable inherent resistance dependent upon the input voltage to its gate (from OP1 control signal 109). Like each of the thermal domains 1-n, the reference domain 120 is supplied with a constant voltage level from power supply 116. The output signal V-Flux 111 is taken from the node between the resistor R2 and the transistor Q2 and provided through T-gate 3 to the input terminal of A-D converter 112. The V-Flux 111 signal is converted from an analog voltage signal to a digital word output by the A-D converter 112 and provided to the system control and I/O 118 as a digital word. As described below, the digital word provided to system control and I/O 118 by the A-D converter 112 is indicative of the temperature change of a particular thermal domain 1-n currently activated by the selection signal 110. While this particular embodiment employs an A-D converter to generate a digital word output from the analog V-Flux signal, the V-Flux signal could also be processed and manipulated with analog circuitry without being converted to a digital word.

As described above, the feedback signal 108 derived as the output signal from the thermal domains 1-n is one input to Op Amp OP1. The other input signal to OP Amp OP1 is a setpoint voltage signal provided by D-A converter 107. The setpoint voltage signal represents a corresponding setpoint temperature that is appropriate to deliver to the thermal domains 1-n to establish a desired setpoint "reference" temperature on each of the thermal domains at the outset. The input to the D-A converter 107 is a digital word provided by the system control and I/O 118. While this particular embodiment of the invention has been described herein as having a D-A converter 107 to provide the setpoint voltage signal, many other methods of providing the setpoint voltage could be employed within the scope of this invention, including directly providing an analog setpoint voltage to Op Amp OP1.

While the above-described structure of this particular embodiment are sufficient to perform the function of sensing a thermal "signature" of an external influence (i.e., external material), additional signal pathways are illustrated in FIG. 5 for performing additional functions. For example, signal pathway 114 is provided between V-Flux signal 111 and feedback signal input 108 through T-gate 4. T-Gate 4 is selectively activated in response to an enable signal from system control and I/O. By selectively de-activating all of the output signals from the thermal domains 1-n (by providing a selection signal 110 indicative of "no selection") and activating T-gate 4, the feedback signal provided to op amp OP1 is provided from the output of the reference domain 120 instead of one of the thermal domains 1-n. This mode of operation could be useful for calibration purposes. During normal operation, T-gate 4 would normally be de-activated.

Similarly, signal pathway 113 provides additional functionality to the described embodiment of the circuit. Signal pathway 113 extends between T-gate 1 of each of the thermal domains 1-n and the input terminal of A-D converter 112 through T-gate 5. T-gate 5 is selectively activated in response to an enable signal from system control and I/O 118. Signal pathway 113 effectively permits the output voltage signals from each of the thermal domains 1-n to be delivered directly to the A-D converter and decoded by the A-D converter 112 as digital output words. For example, if T-gate 3 is de-activated and T-gate 5 is activated, the input signal delivered to the A-D converter will be derived from the node between resistor R1 and transistor Q1 of the particular thermal domain 1-n that is activated by selection signal 110. Again, this mode operation could be useful for purposes of calibration, testing, and/or simply a different mode of operation. During normal operation, T-gate 5 would normally be de-activated.

Now, an exemplary method of operating the described circuit will be described, with reference to FIGS. 5 and 6. Generally, as indicated at steps 701 and 703 of FIG. 6, before monitoring the thermal domains for changes in temperature as a result of an external influence, a nominal setpoint temperature is established on each of the thermal domains 1-n. Each thermal domain 1-n is initialized to the setpoint temperature one at a time. That is, the selection signal 110 activates each of the thermal domains (by activating T-gates 1 and 2) one at a time to receive an input voltage signal to the gate of Q1 to establish the desired setpoint temperature on the thermal domains. For this purpose, a digital word, indicative of the desired setpoint temperature, is provided to the D-A converter 107 by system control and I/O 118. The digital word is converted into an analog voltage signal, shown in FIG. 5 as a "setpoint" signal, which is delivered to an input terminal of Op Amp OP1. The nominal setpoint temperature can be the same for each of the thermal domains or it can differ from one thermal domain to the next in a predetermined pattern.

As described above, the feedback signal 108 provided to the other input terminal of OP Amp OP1 is derived from the output signals of the thermal domains 1-n. The output of the Op Amp OP1 is output signal 109 (contemplated to be a voltage signal) that is provided to the gates of the thermal domains 1-n, effectively controlling the variable inherent resistance of the thermal domains 1-n. One of ordinary skill in the art will recognize, in light of this disclosure, that the configuration of the circuitry herein described functions to establish a fixed voltage level at the output node of each thermal domain between resistor R1 and transistor Q1. As a result, each thermal domain 1-n will have a fixed voltage level applied to the node above the resistor R1 (by power supply 116) and have a fixed voltage level established at the output node between resistor R1 and transistor Q1 (as a result of the feedback loop through op amp OP1). Accordingly, the voltage drop across R1 will be initially fixed at a constant level for each thermal domain 1-$n$. The current flow through resistor R1 dissipates thermal energy corresponding to the voltage drop across resistor R1, and, as a result, causes the temperature of the thermal domain (the thermal conducting layer 26 of the device) to equal the setpoint temperature.

As each of the thermal domains 1-$n$ are "initialized" to the setpoint temperature, the same output voltage signal 109 from the op amp OP1 is also supplied to the gate of transistor Q2 of the reference domain 120. Recall that the reference domain also receives the constant voltage supplied by power supply 116. As a result, the voltage level between resistor R2 and transistor Q2 (i.e., V-Flux 111) is initially set to be equal to the voltage level between resistors R1 and transistors Q1 of the thermal resistors 1-$n$. In this way, the output signal (V-Flux 111) initially mirrors the output signal of each of the thermal domains 1-$n$ (at the node between resistor R1 and transistor Q1). As described herein, the output signal V-Flux 111 will be indicative of a change in power (current) necessary to maintain the temperature of the thermal domains at their setpoint temperatures, which in turn corresponds to the thermal character of the external influence. The output signal V-Flux 111 is provided to the input terminal of the A-D converter to be converted into a digital word. The plurality of digital words produced by the analog to digital converter 112 (one for each sampling of each thermal domain) constitutes the output of the thermal characterization chip and which are indicative of the thermal "signature" of the external influence.

Figure 6:
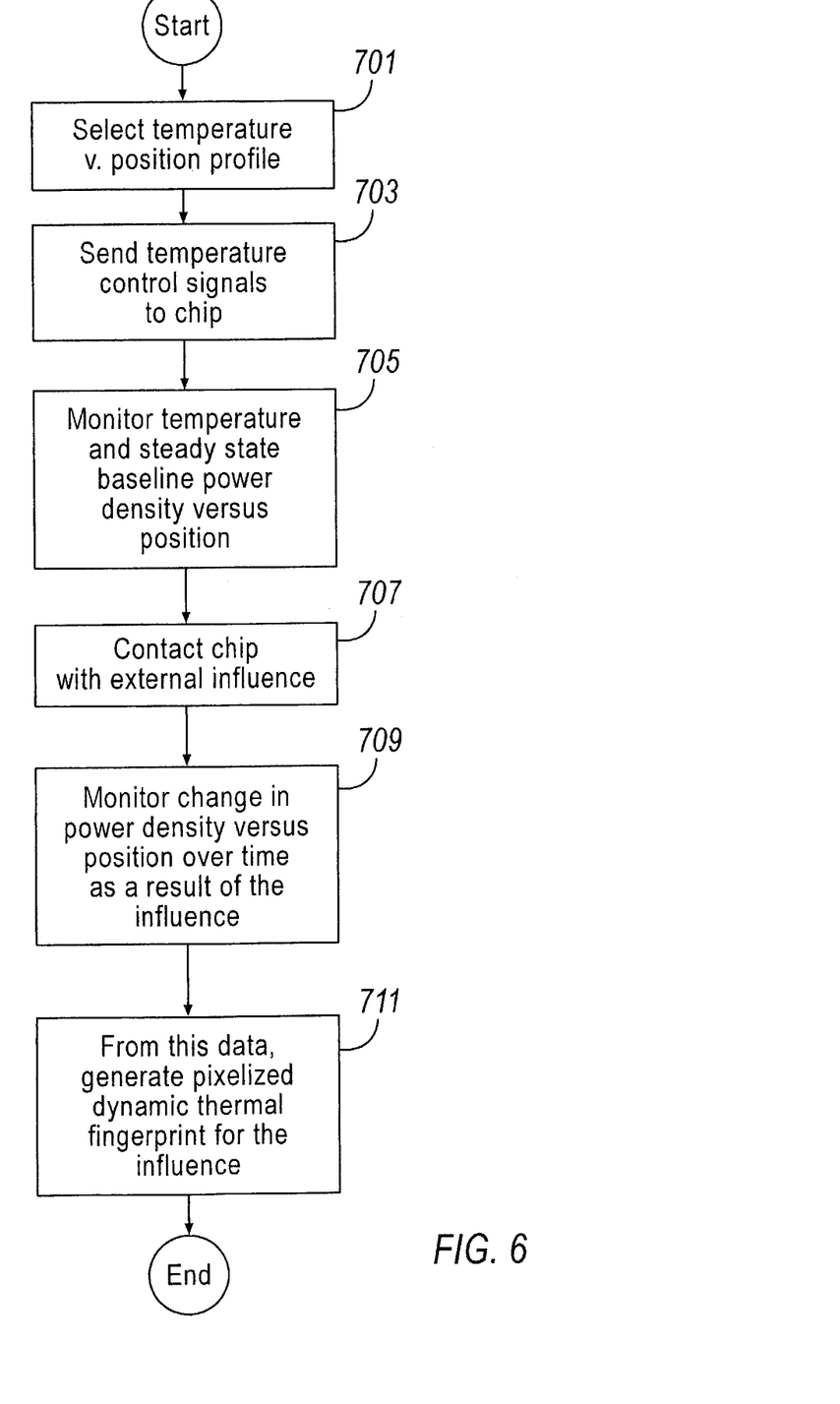
FIG. 6 is a flowchart illustrating steps of an embodiment of a method of generating a dynamic thermal signature using a thermal characterization chip.

After each of the thermal domains 1-$n$ have been initialized to the desired setpoint temperature, the steady state output of each thermal domain 1-$n$ is monitored to establish a "baseline" for the receiving surface of the thermal characterization chip, as indicated in step 705 of FIG. 6. Each thermal domain 1-$n$ is monitored by periodically activating each of the thermal domains in sequence and sampling the output signal V-Flux 111 associated with that thermal domain, as described in more detail below.

After each of the thermal domains 1-$n$ have been initialized to the desired setpoint temperature and the steady-state power level has been monitored and determined, the thermal characterization chip is ready to monitor and sense temperature changes in the thermal domains caused by an external influence. As indicated at step 707 of FIG. 6, the external influence, such as any object or material, can be placed in contact with the receiving surface of the thin layer film 12. Then, as indicated at step 709, the change in power density (as a result of the external influence) of each thermal domain is monitored over time in the manner described below.

The various temperatures across the external object or material affect the temperatures of the resistive layer 22—i.e., the resistor R1—of each of the thermal domains 1-$n$. For example, if the temperature of the external influence is less than the temperature of the contacting thermal domain, the external influence will absorb energy from the thermal domain, thereby tending to lower the temperature of the thermal domain and the resistor R1. The change in temperature of the resistor R1 tends to cause a change in the voltage drop across R1. However, the feedback loop (through T-gate 1 to the Op Amp OP1 as the "feedback" signal 108 and through T-gate 2 to the gate of transistor Q1), tends to force the voltage level at the node between resistor R1 and transistor Q1 to the setpoint voltage. When the voltage level at the node between resistor R1 and transistor Q1 begins to change as a result of the temperature influences of the external material, the feedback signal 108 to op amp OP1 changes. The op amp OP1 tends to drive the feedback signal to equal the voltage setpoint signal. Accordingly, the output signal 109 of OP1, which is applied to the gate of transistor Q1, adjusts the inherent resistance of transistor Q1 so as to maintain the desired constant voltage level at the node between resistor R1 and transistor Q1. The amount of current drawn through resistor R1 changes in response to the change in the inherent resistance of transistor Q1, which results in a change in the thermal energy dissipated by resistor R1 to maintain the thermal domain temperature at the setpoint temperature. Thus, the resistance change in R1 (caused by the external material influence) ultimately causes a change in the inherent resistance of Q1 in order to maintain the original voltage level at the node between resistor R1 and the transistor Q1.

Recall that OP1 output signal 109 is also provided to transistor Q2 of the reference domain 120. Accordingly, as the inherent resistance of transistor Q1 is adjusted by OP1 output signal 109, so is the inherent resistance of transistor Q2. However, the resistance of resistor R2 (of the reference domain 120) is not temperature dependent and/or the reference domain 120 is thermally isolated from the thermal domains 1-$n$ and the external influence. Therefore, as the inherent resistance of transistor Q2 changes, the output signal V-Flux 111 changes proportionately. As a result, a change in V-Flux 111 is indicative of a change in power density in one of the thermal domains 1-$n$, i.e., the thermal domain that is activated in response to the selection signal 110. The change in power density corresponds to the thermal characteristics of the external influence. The V-Flux 111 output signal 111 is provided through T-gate 3 to the input terminal of the A-D converter 112, where the analog output signal V-Flux 111 is converted to a digital word suitable for further processing, display, etc.

According to the described embodiment of the invention, each thermal domain is individually and exclusively activated in response to the selection signal 110. Therefore, as described above, when initializing the thermal domains 1-$n$ to the desired setpoint temperature, each thermal domain is initialized one at a time. Similarly, when the thermal domains 1-$n$ are sensing an external influence, each thermal domain 1-$n$ is individually and exclusively sampled to elicit any temperature change in the thermal domain as a result of the external material. Specifically, in response to the selection signal 110, one thermal domain 1-$n$ is activated at a time (by activating T-gates 1 and 2). When a particular thermal domain is activated, the feedback loop depends on the output signal from the activated thermal domain, and, as a result, the OP1 output signal 109 is dependent upon the activated domain. Because the transistor Q2 of the reference domain 120, and ultimately the output signal V-Flux 111, is dependent upon the OP1 output signal 109, the digital word produced by the A-D converter is indicative of a change in power density in the activated thermal domain resulting from a change in temperature of the external influence. Accordingly, the system control and I/O 118 generally causes the selection signal 110 to continuously activate the thermal domains 1-$n$ one at a time in order to effectively "sample" each of the thermal domains over time. Thus, each thermal domain 1-$n$ is sampled with a particular sampling rate, which is determined by the system control and I/O 118. The digital words produced by the A-D converter 112 can be stored, manipulated, processed, etc. by system control and I/O 118 or other circuitry that is not shown in this embodiment.

In the manner described above, the thermal characterization chip effectively measures a change in power level necessary to maintain a constant temperature profile. The change in power level for each thermal domain is measured over time for each thermal domain. For a given thermal domain, the change in power level over time constitutes the "thermal signature" for that particular domain, and, a plurality of thermal signatures for individual thermal domains arranged in a two-dimensional array constitutes a thermal signature for the entire external influence. The data that constitutes the "thermal signature" for the external influence can be processed and displayed in a variety of ways, such as generating a human-viewable representation of the dynamic thermal signature, as indicated at step 711 of FIG. 6.

In the described embodiment of the invention, it is useful to establish a sampling frequency of the thermal domains 1-n based upon the thermal time constant of the thermal domains and/or the particular type of external material to be sensed. The thermal time constant for a domain is a material property of the thermal domain relating to the speed with which a relatively hot domain cools relative to the rest of the temperature-sensing chip 10. The thermal time constant is affected by a variety of factors, such as the thermal capacity of the domains and the thermal barriers that may impede heat from flowing away from the domains. One way to define the thermal time constant of a given thermal domain is the time, $\tau$, required for a thermal domain to drop in temperature by a factor of $1/e$ in the absence of a driving function, such as a heater input. The thermal time constant, $\tau$, can be determined by estimated using various heat transfer models known to those of skill in the art, such as the "lumped capacitance" model, for example. In this case, it is useful to sample each of the thermal domains at a frequency of $1/\tau$ or greater to obtain an accurate two-dimensional dynamic signature for an external influence.

In addition, the frequency of sampling the thermal domains 1-n may be influenced by the expected type of external material to be monitored. In the described embodiment, the system control and I/O 118 can dynamically adjust the sampling rate with which the thermal domains 1-n are sampled for temperature changes by increasing or decreasing the speed at which the selection signal 110 selectively activates the different thermal domains. The sampling rate can be adjusted for different external influences, or even while the thermal signature for a single external influence is being obtained. It is useful to maintain a sampling rate that is sufficiently high to capture a desirable number of temperature changes in the thermal domains.

This disclosure does not specify any particular nominal sizes for the various resistors and transistors used in this embodiment, as the nominal sizes are generally merely a design choice. However, in this embodiment, regardless of the size, it is desirable that resistors R1 (for each of the thermal domains 1-n) and transistors Q1 (of each of the thermal domains 1-n) be of the same specifications, respectively. The resistor R2 and transistor Q2 (of the reference domain 120) may be of the same specifications as their counterparts R1 and Q1 in the thermal domains 1-n. However, the resistor R2 and transistor Q2 may also be sized differently from their counterparts R1 and Q1. For example, it may be useful to proportionally size R2 and Q2 larger than their counterparts R1 and Q1 in order to scale the output signal V-Flux 111 to a larger value, thereby increasing the signal to noise ratio.

While the monitoring and control circuitry of the thermal characterization chip has been described in connection a single grouping of thermal domains 1-n. It is contemplated that a thermal characterization chip could include many thermal domains grouped in a variety of ways. Specifically, a thermal characterization chip could include many thermal domain groupings similar to the one described above. Further, the exemplary embodiment of the invention describes sensing the thermal domain output signal (at the node between resistor R1 and Q1 in FIG. 5) to control the temperature of the thermal domain by sensing the voltage level at that node. One of skill in the art would recognize alternative methods of sensing a thermal parameter of a thermal domain that are within the scope of this invention, such as directly sensing current flow through the thin film resistor and using that parameter to maintain the temperature of the thermal domain.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements. Further, the use of the words "first", "second", and the like do not alone imply any temporal order to the elements identified. The invention is limited by the following claims.

What is claimed is:

1. A thermal characterization chip comprising:
    a substrate having overlying electronics, the electronics including semiconductor circuitry and thin film circuitry overlying the semiconductor circuitry;
    wherein the electronics define a plurality of thermal domains, each of the domains defining a portion of a receiving surface for receiving an external influence that alters a thermal parameter within the thermal domains;
    wherein the thin film circuitry forms a thin film resistor having a temperature-dependent variable resistance for heating each of the domains;
    wherein the electronics further comprises monitoring circuitry for monitoring the thermal parameter in each of the thermal domains over a test time period; and
    wherein the monitoring circuitry includes a plurality of control-signal dependent variable resistance devices associated with each domain, wherein each control-signal dependent variable resistance device is connected in series with an associated one of the thin film resistors, thereby forming a voltage divider circuit having a thermal domain output signal associated with each thermal domain.

2. The thermal characterization chip of claim 1, wherein the control-signal dependent variable resistance devices comprise transistors.

3. The thermal characterization chip of claim 1, wherein the monitoring circuitry further comprises a feedback loop dependent upon the thermal domain output signal and configured to adjust the resistance of the control-signal dependent variable resistance device to maintain the temperature of the thermal domain at a reference temperature.

4. The thermal characterization chip of claim 3, further comprising a reference domain that is thermally isolated from the thermal domains, the reference domain being configured to generate an output signal indicative of a change in the thermal parameter of an activated one of the thermal domains.

5. The thermal characterization chip of claim 4, wherein the reference domain comprises a constant resistance device and a control-signal dependent variable resistance device connected in series to provide a voltage divider circuit, wherein the resistance of the control-signal dependent variable resistance device of the reference domain is controlled by the same signal that controls the control-signal dependent variable resistance devices of the thermal domains.

6. The thermal characterization chip of claim 5, wherein the electronics further comprises an analog to digital converter configured to convert the output of the reference domain into a digital word.

7. The thermal characterization chip of claim 1, wherein the monitoring circuitry includes sampling circuitry for sampling the thermal parameter at a sampling rate.

8. A thermal characterization chip, comprising:
   a substrate having overlying electronics, the electronics including semiconductor circuitry and thin film circuitry overlying the semiconductor circuitry;
   wherein the electronics define a plurality of thermal domains, each of the domains defining a portion of a receiving surface for receiving an external influence that alters a thermal parameter within the thermal domains;
   wherein the electronics further comprises monitoring circuitry for monitoring the thermal parameter in each of the thermal domains over a test time period, said monitoring circuitry including sampling circuitry for sampling the thermal parameter at a sampling rate; and
   wherein each of the thermal domains has a characterization thermal time constant and wherein the sampling rate is equal to or greater than a reciprocal of the time constant.

9. The thermal characterization chip of claim 8, wherein the sampling rate of each thermal domain is dynamically adjustable.

10. The temperature sensing device of claim 8, wherein the sampling circuitry includes a selection signal coupled to the plurality of thermal domains, the selection signal being configured to selectively facilitate the generation of a thermal domain output signal for each thermal domain one at a time.

11. A method of generating a dynamic thermal signature, comprising:
   providing a substrate having electronics including semiconductor and thin film circuitry defining a plurality of thermal domains, each of the domains defining a portion of a receiving surface;
   contacting the receiving surface with an external influence that affects a heat flux passing through the receiving surface such that a thermal parameter is altered;
   monitoring the thermal parameter within each of the plurality of domains over a time period at a sampling rate; and
   wherein each domain has a thermal time constant and wherein the sampling rate is equal to or greater than a reciprocal of the time constant.

12. An integrated chip, comprising:
   a substrate having overlying electronics, the electronics including semiconductor circuitry and thin film circuitry overlying the semiconductor circuitry;
   wherein the electronics define a plurality of thermal domains, each of the domains defining a portion of a receiving surface for receiving an external influence that alters a thermal parameter within the thermal domains; and
   means for detecting a change in the thermal parameter including a means for periodically sampling each of the thermal domains to detect changes in the thermal parameter of the thermal domains over time;
   wherein the means for periodically sampling the thermal domains comprises:
   means for activating each of the thermal domains one at a time; and
   circuitry for generating an output signal indicative of a change in the thermal parameter of an activated thermal domain; and
   wherein the means for detecting comprises:
   a plurality of transistors, each transistor coupled in series with a resistor of an associated thermal domain to form a plurality of voltage divider circuits, each voltage divider circuit being associated with a different thermal domain;
   a reference domain having a constant resistance coupled in series to a transistor; and
   a control signal that controls a gate terminal of the transistors of each thermal domain and the reference domain in response to an output signal of the voltage divider circuits.

* * * * *